US006683982B1

United States Patent
Kohn

(10) Patent No.: US 6,683,982 B1
(45) Date of Patent: Jan. 27, 2004

(54) METHOD FOR ANALYZING IMAGES AND FOR CORRECTING THE VALUES OF VIDEO SIGNALS

(75) Inventor: Michael Kohn, Neumünster (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/646,818
(22) PCT Filed: Mar. 18, 1999
(86) PCT No.: PCT/DE99/00754
§ 371 (c)(1),
(2), (4) Date: Nov. 28, 2000
(87) PCT Pub. No.: WO99/49666
PCT Pub. Date: Sep. 30, 1999

(30) Foreign Application Priority Data

Mar. 23, 1998 (DE) .......................................... 198 12 461

(51) Int. Cl.$^7$ ................................................. G06K 9/00
(52) U.S. Cl. ....................................... 382/167; 168/274
(58) Field of Search ................................ 382/162, 167, 382/168, 172, 274; 348/672; 358/518, 521, 522; 345/604

(56) References Cited

U.S. PATENT DOCUMENTS 5,668,890 A 9/1997 Winkelman
5,754,682 A * 5/1998 Katoh ......................... 382/167
5,874,988 A * 2/1999 Gu .............................. 382/167
6,014,457 A * 1/2000 Kubo et al. .................. 382/167

FOREIGN PATENT DOCUMENTS

DE 43 10 727 10/1993
EP 0 723 363 1/1996

* cited by examiner

Primary Examiner—Phuoc Tran
(74) Attorney, Agent, or Firm—Schiff Hardin & Waite

(57) ABSTRACT

In a method for image analysis and correction of video signal values in the processing of video films, whereby analysis values with respect to image range, gradation and color cast of the individual frames of the video film are identified by the image analysis of the video signal values, and the correction of the video signal values is implemented on the basis of the analysis values, the video signal values are initially transformed according to a three-dimensional conversion function into the video signal values of an independent and sensation-conforming, equidistant color space. For each frame of a video sequence composed of a plurality of frames, at least one analysis value is determined on the basis of the transformed video signal values. At least one analysis values representative of the video sequence is formed by forming the average of the corresponding analysis values of the frames of the video sequence.

8 Claims, 1 Drawing Sheet

METHOD FOR ANALYZING IMAGES AND FOR CORRECTING THE VALUES OF VIDEO SIGNALS

BACKGROUND OF THE INVENTION

The invention is in the field of electronic video technology and is directed to a method for image analysis and correction of video signal values in the processing of video films.

In the production of a video film, individual scenes are recorded with a video camera, whereby each scene represents a video sequence composed of a plurality of frames, and the video signal values are deposited in an image store. After the shots, the video film is processed in a video processing station. In the post-processing, the design of the video film occurs by cutting and by producing titles as well as a color correction supported by an image analysis with which deficiencies are compensated or colors are editorially changed.

In an image analysis, color values are investigated, for example, in view of the image range, the image gradation and a potentially existing color cast. Image light and image dark values are acquired with an image range analysis for an adaptation of the image range; a gradation correction curve for a contrast correction is determined with an image gradation analysis; and color cast values for a color cast correction are determined with a color cast analysis.

For the traditional color correction, analog image analysis methods based on the color values R, G and B are usually employed wherein the image range analysis and the color cast analysis occur directly on the basis of the color values R, G and B, and the image range analysis occurs on the basis of a brightness signal derived from color values R, G and B. The traditional methods have the disadvantage that they are relatively slow and that the analysis results must be largely manually converted into corresponding corrections.

DE-C-43 10 727 already discloses a method for the analysis of an image original to be reproduced in the preliminary printing stage, whereby RGB color values are transformed into corresponding Lab color values of a sensation-conforming, equidistant CIELAB color space, and the analysis of the image original is undertaken on the basis of the transformed Lab color values, as a result whereof optimum analysis results are nearly automatically obtained in view of image range, image gradation and/or color cast. This publication, however, contains no teaching to apply the analysis method to the video signal values of individual frames and video sequences of a video film.

EP-A-0 723 363 discloses a method for realizing an inventive color adaptation, whereby RGB color values of individual color images or color image sequences are transformed into a color space adapted to the visual sensation of man and are subsequently transformed back. Although the known method is applied to color image sequences, no analysis with respect to image range, image gradation and/or color cast occurs on the basis of transformed Lab color values of the CIELAB color space.

SUMMARY OF THE INVENTION

It is therefore an object of the present invention to improve a method for image analysis and correction of video signal values in the processing of video films such that optimum analysis results are achieved for a color correction of video frames and video sequences.

According to the present invention, a method is provided for image analysis and correction of video signal values and processing of a video film composed of video sequences, each video sequence being composed of a plurality of frames. Video signal values of a first color space are transformed according to a three-dimensional conversion function into video signal values of a second color space that is independent of the first color space and is equidistant and conforming to sensation. At least one analysis value representative of a video sequence is formed by forming an average of analysis values of analyzed frames of the video sequence. A three-dimensional correction function is respectively determined from the analysis values representative of the video sequence. At least the video signal values of the corresponding video sequence are corrected according to the identified correction function.

The invention is explained in greater detail below on the basis of the FIGURE.

DESCRIPTION OF THE PREFERRED EMBODIMENTS

Figure 1:
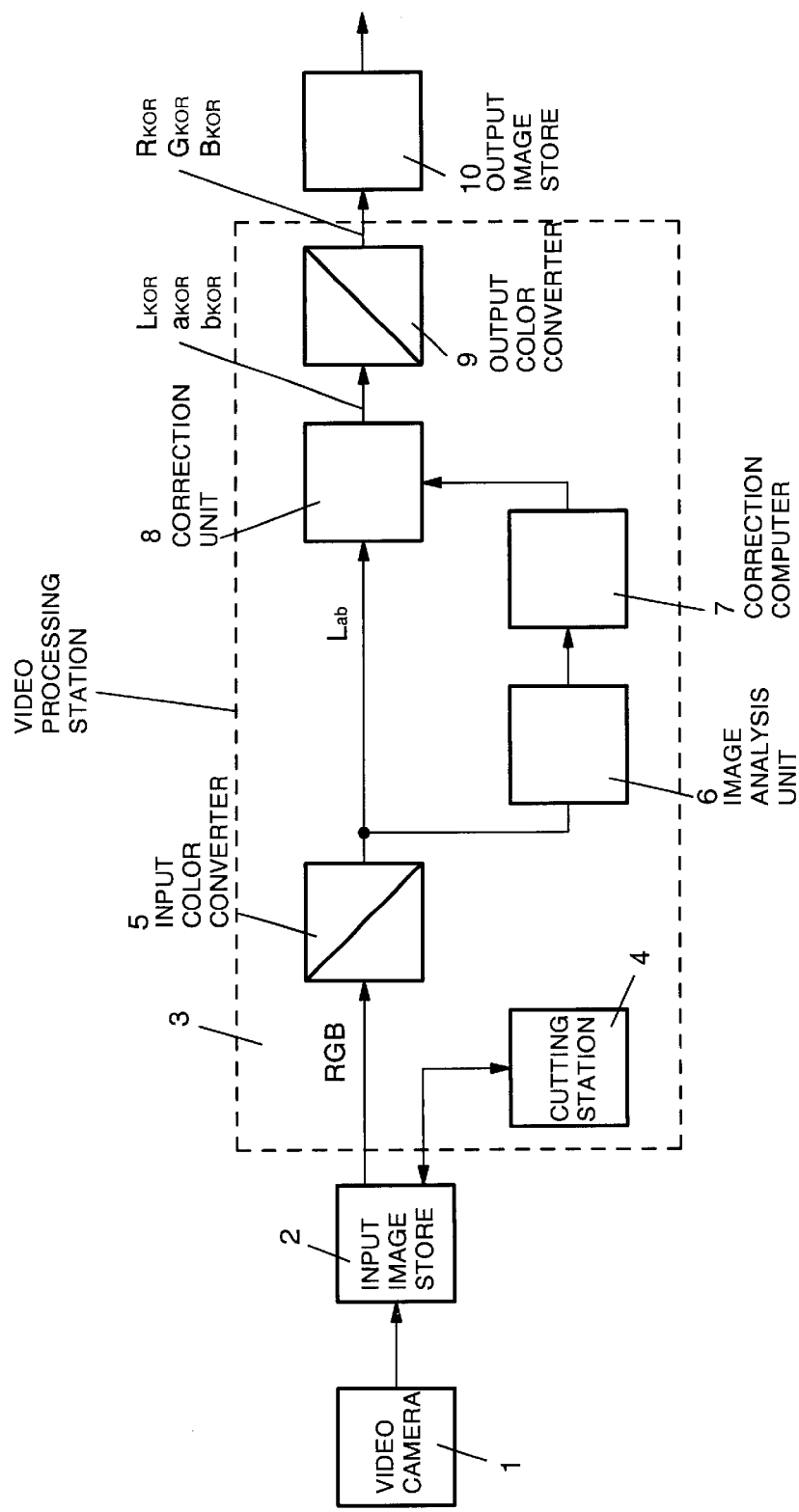
FIG. 1 shows in a block diagram the fundamental signal flow in conjunction with a video processing station.

A video camera 1 as an input device registers a plurality of video sequences composed of individual frames. The video signal values R, G and B generated by the video camera 1 are deposited in an input image store 2. After the exposure, the video film is processed in a video processing station 3. In the post-processing, the design of the video film initially occurs by cutting and by producing titles in a cutting station 4. For that purpose, the video signal values (R, G, and B) are transferred from the input image store 2 into the cutting station 4 and are written back onto the input image store 2 after the processing.

After the design, the color correction supported by an image analysis occurs, deficiencies being compensated or colors being editorially modified therewith. For that purpose, the video signal values R, G and B are first supplied to an input color converter 5 wherein the video signal values R, G and B of the input color space specified for the video camera 1 are transformed according to the three-dimensional conversion function L, a, b=f(R, G, B) into the video signal values L, a and b of the sensation-conforming, equidistant L, a, and b color space that is independent from the input color space.

The transformed signal values L, a and b are supplied video by video to an image analysis unit 6 at which a pre-selection can be undertaken as to whether the image analysis is to occur with respect to the image range and/or the image gradation and/or a potentially existing color cast.

In the image range analysis of a frame, the frequency distribution (brightness histogram) of the brightness component L of the transformed video signal values L, a and b in the frame is identified. Subsequently, the image light value $B_L$ of the frame and the image dark value $B_T$ of the frame are determined from the frequency distribution by defining the maximum and minimum brightness value L dependent on the curve of the frequency distribution in the image light region and in the image dark region. The image range analysis is disclosed in detail in DE-C-43 10 727 and DE-C-43 09 879.

In the image gradation analysis of a frame, the frequency distribution of the brightness values L is advantageously defined only from the image-important regions of a frame. For that purpose, the frame is initially divided into sub-frames. For each sub-frame, a histogram of the brightness values L in the form of sub-image histograms is determined. The sub-image histograms are interpreted with statistical methods and the image-important sub-frames are classified. From the sub-image histograms of the classified sub-frames, an aggregate histogram is calculated that corresponds to the frequency distribution of the brightness values L from the image-important regions of the frame. A correction curve for the image gradation characteristic is then derived from the aggregate histogram according to a method of histogram modification. The image gradation analysis is disclosed in detail in DE-C-43 10 727 and DE-C-43 09 878.

In color cast analysis, the region of high brightness values and/or the region of low brightness of the brightness component L in the frame to be analyzed is divided into at least one brightness region for reliable acquisition of a color cast in the frame. The color cast in the respective brightness range is determined as an average deviation of the video signal values from non-chromatic pixel-by-pixel averaging of the video signal values a and b in the corresponding brightness regions. The color cast to be consulted for the interpretation of the color cast analysis is then formed by selection and/or combination of color casts determined for the brightness ranges. The color cast analysis is disclosed in detail in DE-C-43 10 727 and DE-C-43 09 877.

Inventively, a set of analysis values such as image light value, image dark value, color cast value and gradation correction values are initially determined in the image analysis for each of the m frames of the respectively current video sequence, and the set of analysis values that is representative of the current video sequence is then determined by forming the average from the m sets of analysis values of the frames.

In order to obtain faster analysis results, it proves advantageous to analyze only every $n^{th}$ frame of a current video sequence, and to determine the set of analysis values representative of the current video sequence from the n sets of analysis values of the investigated frames, whereby "n" can be selected by the operator.

For further improvement of the results of the image analysis, a modification of the averaging of the image range advantageously occurs in that a determination is made on the basis of an empirically identified weighting factor G as to whether the actual image light value $B_L$ and image dark value $B_T$ deviates from the averaged image light value $B_{LM}$ and image dark value $B_{TM}$, so that the corresponding correction has a somewhat more or less effect. The modified image light value $B^*_L$ and the modified image dark value $B^*_T$ then derive according to the following equations taking the standard deviation of the image light and image dark values into consideration:

$$B^*_L = B_{LM} - D \times G$$

$$B^*_T = B_{TM} + D \times G$$

The analysis values for the individual video sequences automatically determined on the basis of the video signal values L, a and b of the L, a b color can be manually modified as needed by the operator in order, for example, to achieve special color designs. The automatically determined or, potentially, manually modified analysis values are supplied to a correction computer 7. In the correction computer 7, corresponding three-dimensional correction functions $L_{KOR}$, $a_{KOR}$, $b_{KOR}$=f(L, a, b) for the individual video sequences, for example ICC color profiles, are calculated on the basis of the analysis values of the individual video sequences and are input into a correction unit 8. By observing the individual scenes of the video film on a monitor, for example, the operator can thereby decide whether each video sequence should be corrected with its separately calculated ICC color profile or whether a plurality of successively following video sequences should be corrected with the ICC color profile of one of the successively following video sequences.

The color correction occurs after the calculation of the ICC color profiles. For the purpose, the video signal values R, G and B are first sequentially read out from the input image store 2 and are transformed into the video signal values (L, a and b) in the input color converter 5. The transformed video signal values L, a and b are then corrected in the correction unit 8 according to the correction function $L_{KOR}$, $a_{KOR}$, $b_{KOR}$=f(L, a b). Subsequently, the corrected video signal values $L_{KOR}$, $a_{KOR}$ and $b_{KOR}$ are transformed back into the corrected video signal values $R_{KOR}$, $G_{KOR}$ and $B_{KOR}$ in an output color converter 9 according to the function $R_{KOR}$, $G_{KOR}$, $B_{KOR}$=f($L_{KOR}$, $A_{kor}$, $b_{KOR}$) and are intermediately stored in an output image store 10 until further-processing.

The input color converter 5, the correction unit 8 and the output color converter 9 are formed, for example, as lookup tables (LUT) wherein the output values are stored in addressable fashion by the functionally corresponding input values.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for image analysis and correction of video signal values in processing of a video film composed of video sequences, each video sequence being composed of a plurality of frames, comprising the steps of:
   transforming video signal values of a first color space according to a three-dimensional conversion function into video signal values of a second color space that is independent of the first color space and is equidistant and conforming to sensation;
   forming at least one analysis value representative of a video sequence by forming an average of analysis values of analyzed frames of the video sequence;
   respectively determining a three-dimensional correction function from the analysis values representative of the video sequence; and
   correcting at least the video signal values of the corresponding video sequence according to the identified correction function.

2. The method according to claim 1 wherein
   all frames of the video sequence are utilized for the image analysis of the video sequence; and
   at least one analysis value representative of the video sequence is formed by forming an average of the analysis values of the frames of the video sequence.

3. The method according to claim 1 wherein
   frames of the video sequence are selected for the image analysis; and
   at least one analysis value representative of the video sequence is formed by forming an average of the analysis values of the selected frames of the video sequence.

4. The method according to claim 1 wherein the correction function is an ICC color profile.

5. The method according to claim 1 wherein in the analysis of the image range of a frame, the frequency distribution of the brightness component of the transformed video signal values is identified in the frame; and as analysis values, an image light value of the frame and an image dark value of the frame are determined from the frequency distribution by defining maximum and minimum brightness values dependent on the curve of the frequency distribution in an image light region and an image dark region.

6. The method according to claim 1 wherein in the analysis of the image gradation of a frame, the frame to be analyzed is geometrically divided into a plurality of sub-images;

a frequency distribution of brightness components of the video signal values in the corresponding sub-image is defined as a sub-image histogram for each sub-image;

the sub-image histograms of the individual sub-images are interpreted and the sub-images that are image-important for the image gradation are identified on the basis of the evaluation;

an aggregate histogram is calculated from the sub-image histograms of the image-important sub-images, said aggregate histogram corresponding to the brightness distribution of the brightness component of the image values in the image-important sub-images; and a correction curve for correction of an image gradation characteristic of the frame is determined as an analysis value from the aggregate histogram according to a method of histogram modification, which is determined for the purpose of contrast correction.

7. The method according to claim 1 wherein in the analysis of a color cast of a frame, for acquiring a color cast in the frame, dividing a region of high brightness values and a region of low brightness values of the brightness component of the video signal values in the frame to be analyzed into at least one brightness range;

determining a value of a potentially existing color cast in the respective brightness range by averaging the color components of the video signal values in the brightness ranges; and forming the color cast value for the evaluation of the color cast analysis as an analysis value by selecting or combining color cast values determined for the individual brightness ranges.

8. A method for image analysis and correction of video signal values in processing of a video film composed of video sequences, each video sequence being composed of a plurality of frames, comprising the steps of:

transforming video signal values of a first color space according to a three-dimensional conversion function into video signal values of a second color space different than the first color space and conforming to sensation;

forming at least one analysis value representative of a video sequence by forming a representative value of analysis values of analyzed frames of the video sequence;

respectively determining a three-dimensional correction function from the analysis values representative of the video sequence; and correcting at least the video signal values of the corresponding video sequence according to the identified correction function.

* * * * *